No. 893,935. PATENTED JULY 21, 1908.
R. A. MOORE.
FASTENING DEVICE FOR MEN'S GARTERS.
APPLICATION FILED FEB. 24, 1908.

Witnesses
C. J. Reed.
C. L. Weed.

Roswell A. Moore
Inventor
by Seymour & Earle
Attys

UNITED STATES PATENT OFFICE.

ROSWELL A. MOORE, OF BERLIN, CONNECTICUT, ASSIGNOR TO WATERBURY BUCKLE CO., OF WATERBURY, CONNECTICUT.

FASTENING DEVICE FOR MEN'S GARTERS.

No. 893,935.　　　　Specification of Letters Patent.　　　　Patented July 21, 1908.

Application filed February 24, 1908. Serial No. 417,389.

*To all whom it may concern:*

Be it known that I, ROSWELL A. MOORE, a citizen of the United States, residing at Berlin, in the county of Hartford and State of Connecticut, have invented a new and useful Improvement in Fastening Devices for Men's Garters; and I do hereby declare the following, when taken in connection with the accompanying drawings and the letters of reference marked thereon, to be a full, clear, and exact description of the same, and which said drawings constitute part of this specification, and represent, in—

Figure 1:
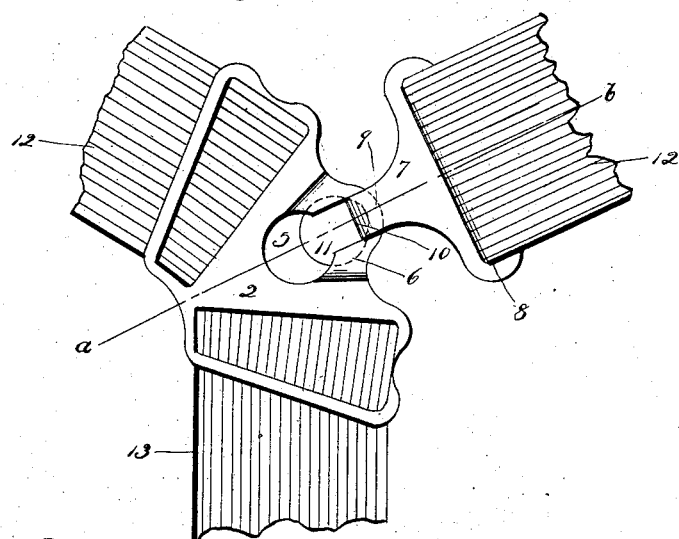
Figure 2:
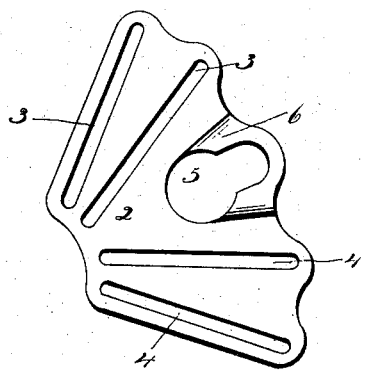
Figure 3:
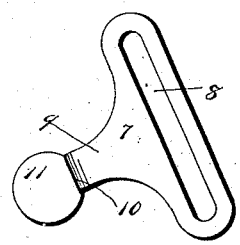
Figure 4:

Figure 1 a view in front elevation of a fastening device for men's garters constructed in accordance with my invention, the device being shown as webbed. Fig. 2 a detached plan view of the fan-shaped corner-plate. Fig. 3 a similar view of the hook-member. Fig. 4 a view in section on the line $a$—$b$ of Fig. 1, showing the corner-plate and hook-member in engagement.

My invention relates to an improvement in fastening devices for men's garters, the object being to produce at a low cost for manufacture, a device constructed with particular reference to simplicity of construction and facility of operation.

With these ends in view my invention consists in a fastening device for men's garters having certain details of construction and combinations of parts as will be hereinafter described and pointed out in the claims.

In carrying out my invention as herein shown, I employ a fan-shaped corner-plate 2 made from a single piece of sheet-metal and having a pair of webbing slots 3 above its center and a corresponding pair of webbing slots 4 below its center, the slots of each pair of slots being divergent and therefore symmetrical with the shape of the plate. Midway between these two pairs of slots I form an opening 5 in the shape of a key-hole and arranged with its longer axis in line with a radius of the plate 2 and with its circular larger or post-end adjacent to the narrower end of the plate and its narrower parallel-sided outer or bit-end adjacent to the outer edge of the plate. As shown, the metal about the outer or bit-end of the opening 5 is struck up to form a boss 6, whereby the said end of the opening is lifted into a plane above the plane of the plate to form a recess in the inner face thereof. For use in connection with such a corner-plate I employ a hook-member 7 having an eye 8 and provided at its opposite end not with a hook proper, but with a shank 9 having a bend 10 which terminates in a small coupling-disk 11 which on account of the bend 10, is located in a plane below the body of the hook-member 7. The disk 11 is a trifle smaller in diameter than the inner or post-end of the opening 5, while the shank 9 is a trifle narrower than the outer or bit-end of the said opening.

In using the fastener, the disk 11 is passed through the circular inner end of the opening after which the corner-plate and hook-member are drawn apart, whereby the edges of the coupling disk 11 are caused to pass under the plate 2 at points adjacent to the bit-end of the opening 5. The coupling-disk 11 is thus entered into the recess formed by the boss 6 as shown in Fig. 4. The corner-plate and the hook-member are thus coupled together and maintained in this relation by the strain of that portion 12 of the webbing which passes around the leg.

The depending end 13 of webbing terminates, as usual, in a clasp which may be of any approved construction.

I claim:—

In a fastening device for men's garters, the combination with a fan-shaped corner-plate consisting of a single piece of sheet-metal formed with a key-hole shaped opening arranged with its post-end inward and its bit-end outward, the metal around the bit-end of the opening being lifted into a plane above the plane of the plate to form a recess in the inner face thereof; of a hook member having a shank terminating in a circular coupling-disk separated from the shank by a bend which places the coupling-disk in a plane below the plane of the said hook-member and the said coupling-disk and shank of the hook-member being respectively smaller in diameter and narrower than the post and bit-ends of the key-shaped opening in the corner-plate, whereby the said disk enters the said recess when the hook-member is engaged with the corner-plate.

In testimony whereof, I have signed this specification in the presence of two subscribing witnesses.

ROSWELL A. MOORE.

Witnesses:
　MALTBY SMITH,
　H. C. COOLEY.